(12) United States Patent
Belliard et al.

(10) Patent No.: US 8,609,776 B2
(45) Date of Patent: Dec. 17, 2013

(54) UNSATURATED POLYESTER-URETHANE PREPOLYMER AND ITS APPLICATIONS

(75) Inventors: Patrick Belliard, Villers aux Bois (FR); Jérôme Mazajczyk, Biache St Vaast (FR); Roland Delory, Doingt Flamicourt (FR); Guillaume Cledat, Lille (FR); Francis Verdiere, Souchez (FR); Serge Herman, Noeux les Mines (FR)

(73) Assignee: CCP Composites, Courbevoie (FR)

( * ) Notice: Subject to any disclaimer, the term of this patent is extended or adjusted under 35 U.S.C. 154(b) by 379 days.

(21) Appl. No.: 12/307,692

(22) PCT Filed: Jul. 4, 2007

(86) PCT No.: PCT/EP2007/005900
§ 371 (c)(1),
(2), (4) Date: Jan. 6, 2009

(87) PCT Pub. No.: WO2008/003472
PCT Pub. Date: Jan. 10, 2008

(65) Prior Publication Data
US 2009/0312451 A1 Dec. 17, 2009

(30) Foreign Application Priority Data
Jul. 7, 2006 (FR) ..................... 06 06276

(51) Int. Cl.
*C08F 20/00* (2006.01)
*C08G 18/00* (2006.01)
*C08G 63/00* (2006.01)

(52) U.S. Cl.
USPC .............. 525/227; 525/17; 525/25; 525/27; 525/28; 525/36; 525/10; 525/193; 525/222; 525/225; 525/309; 525/386; 525/278; 525/445; 525/176; 528/44; 528/75; 528/83; 528/85; 528/272

(58) Field of Classification Search
USPC ........ 528/75, 44, 83, 85, 272; 525/17, 25, 27, 525/28, 36, 278, 10, 193, 222, 225, 227, 525/309, 386, 440.1, 445, 176; 560/25, 26, 560/158, 528, 525
See application file for complete search history.

(56) References Cited

U.S. PATENT DOCUMENTS 3,008,917 A * 11/1961 Park et al. .............. 525/440.072
4,107,101 A 8/1978 Kubens
(Continued)

FOREIGN PATENT DOCUMENTS

EP 0203361 A2 12/1986
EP 0545824 A1 6/1993
(Continued)

OTHER PUBLICATIONS

English Translation of Document N.*

*Primary Examiner* — Michael L Leonard
(74) *Attorney, Agent, or Firm* — Whyte Hirschboeck Dudek S.C.

(57) ABSTRACT

An ethylenically unsaturated prepolymer comprising an ending X which reacts by condensation being a hydroxyl and/or amine or free isocyanate group and optionally an ending X' having ethylenic unsaturation, the prepolymer being the reaction product of a first component A comprising a mixture of i) a first ethylenically unsaturated resin carrying specific hydroxyl and/or amine reactive endings, and/or ii) optionally a second resin different from resin i), being an ethylenically unsaturated hydroxylated resin and/or a hydroxylated and/or aminated saturated resin, and/or iii) optionally a third reactive saturated resin, iv) optionally an unsaturated monoalcohol up to 30% in equivalents of the OH+NH$_2$ total, and a second component B comprising a polyisocyanate with a functionality equal to 2 or greater than 2, A and B being in proportions to effectively avoid any gelling by crosslinking.

35 Claims, 2 Drawing Sheets

(56) References Cited

U.S. PATENT DOCUMENTS

| | | |
|---|---|---|
| 4,289,682 A | 9/1981 | Peters |
| 4,327,145 A | 4/1982 | Mitani et al. |
| 4,822,849 A * | 4/1989 | Vanderlaan .................. 525/17 |
| 4,857,434 A * | 8/1989 | Klinger ...................... 430/286.1 |
| 5,159,044 A * | 10/1992 | Bogner ........................ 528/75 |
| 5,773,531 A | 6/1998 | Smith |
| 2003/0083443 A1 * | 5/2003 | Santobianco et al. ........ 525/530 |
| 2003/0220035 A1 * | 11/2003 | Fjare ............................ 442/103 |
| 2004/0220340 A1 * | 11/2004 | McAlvin et al. .............. 525/191 |
| 2007/0049686 A1 * | 3/2007 | Bauchet et al. ............... 524/590 |

FOREIGN PATENT DOCUMENTS

| | | | |
|---|---|---|---|
| JP | 56152829 | 11/1981 | |
| JP | 2002201241 | * 7/2002 | ............ C08F 290/06 |
| JP | 2004-059647 | 2/2004 | |

* cited by examiner

UNSATURATED POLYESTER-URETHANE PREPOLYMER AND ITS APPLICATIONS

The present invention relates to a hybrid resin which is, or which comprises, an ethylenically unsaturated prepolymer comprising hydroxyl and/or amine or free isocyanate reactive end functional groups X, to compositions which can crosslink by a double radical and/or condensation route, said composition comprising such a resin, to its process of preparation and to the specific uses of such a resin and of such a composition in various fields of application and use.

U.S. Pat. No. 4,327,145 discloses hybrid compositions produced by mixing, in formulation, an unsaturated polyester component having a high $N_{OH}$ with an isocyanate and optionally with a peroxide having an "isocyanate modification"=NCO eq./OH eq. ratio varying from 0.7 to 1.3, which react together to give a semi-finished product with improved mechanical properties in comparison with the state of the art cited. This state of the art describes mainly formulations formed of SMC (sheet molding compounds) or BMC (bulk molding compounds) in which the isocyanates are added at the time of the formulating. The modification by the isocyanate, with results in the formation of urethane groups, is then carried out by the formulator or final user.

JP 56152829 describes the use, in a formulation, of an unsaturated polyester partially modified by an isocyanate, with use of a saturated monoalcohol after reaction of the polyester isocyanate, to prevent the system from gelling.

JP 2004-059647 also describes a similar composition, the latter being limited to a composition formed of unsaturated polyester based on naphthalenedicarboxylic acid.

EP 545 824 describes a blocked isocyanate-functionalized prepolymer, by use of a large excess of isocyanate.

The use according to the state of the art, in a formulation for SMC or BMC application, of a two-component system based on an unsaturated polyester polyol and on a polyisocyanate has several disadvantages.

Specifically, the exothermicity of the reaction between the isocyanate and the unsaturated polyester brings about a significant rise in temperature on the equipment during the manufacture of SMC or BMC.

The final formulator then has to use impregnating devices specific for the hybrid technology which are capable of cooling the SMC or the BMC.

Moreover, the fact of carrying out all the modification to the isocyanate at the time of the formulating of the SMC brings about a significant reduction in the viscosity of the hybrid SMC or BMC paste at the beginning of the manufacture thereof, due to the low viscosity of the isocyanate. Impregnation is then rendered highly problematic as the excessively fluid hybrid formulation drains and results in overflows of resin in the SMC or BMC impregnating device.

Finally, the conventional technique described in the literature requires the use of large amounts of isocyanate by the final formulator, this product being known to be harmful and its allergenic effect requiring specific precautions and conditions for handling. This constraint requires that it be handled in a highly ventilated area.

Figure 1:
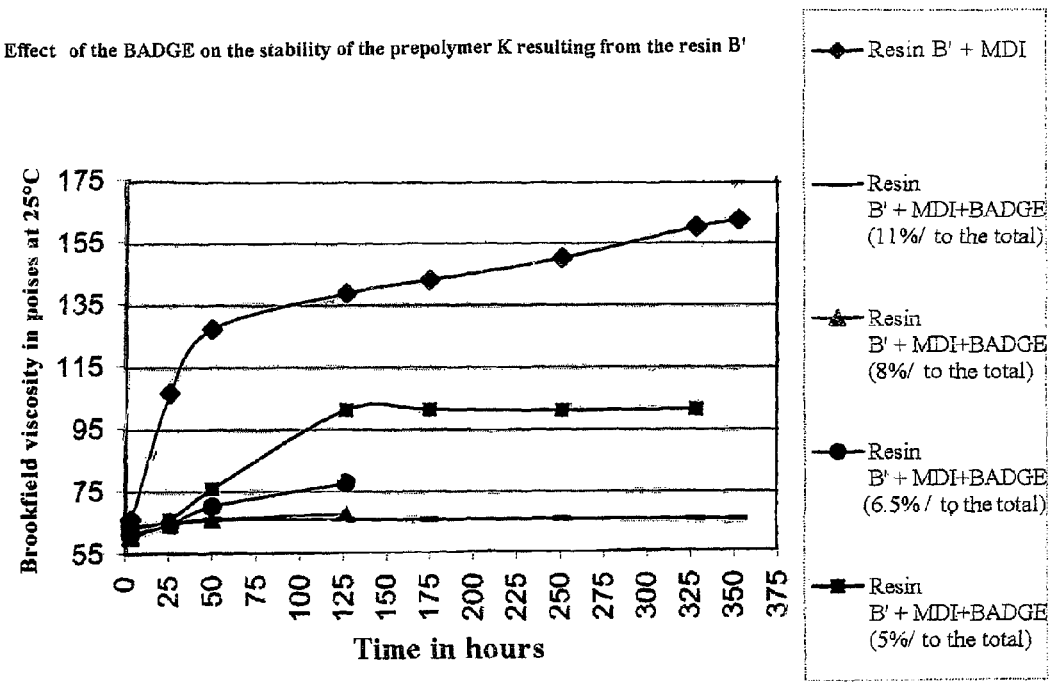
FIG. 1 is a graphical depiction showing the effect on the stability of prepolymer K of varying amounts of BADGE (Bisphenol A Diglycidyl Ether) with said stability measured in terms of evolution of the viscosity with time at 25° C.

The present invention proposes to overcome all these disadvantages, and in particular to reduce or eliminate the use of polyisocyanates by the final formulator, by the use of specific prepolymers (already comprising urethane bonds) defined below according to the present invention, these prepolymers making possible better control of the reaction during the formulation by the final user, an improvement in the reproducibility of the molded components, and standard conditions for preparing and molding the formulation without specific precautions required in the case of the handling of the polyisocyanate by the conventional route as described in the state of the art. These advantages are obtained without negatively affecting the final applicative performance, while in some cases introducing significant improvements.

The use of prepolymers comprising hydroxyl and/or amine or free isocyanate end functional groups according to the present invention overcomes the abovementioned disadvantages, in the case of formulations of SMC or BMC type but also in other types of applications, using double crosslinking by the radical route or by the route of condensation of isocyanate with other reactive functional groups carried by the resin. Mention may be made, as other such applications, of molding compositions, composites, lightened composites, including foams, laminates, prepregs, mastics, adhesives, coatings, barrier coats, gel coats, IMCs (In Mold Coatings), polyester concretes, artificial marbles and the in situ repair of buried pipes, including oil pipes or water pipes.

The present invention provides two types of prepolymers.

According to a first concept of the invention, the unsaturated polyester is delivered to the final user in the form of an unsaturated urethane polyol prepolymer obtained by an isocyanate modification of said polyester, with a ratio r=NCO/OH, expressed in equivalents, corresponding to a significant deficiency in isocyanate and where OH represents, within the broadest sense, all the functional groups of the unsaturated polyester resin which react with NCO.

According to the concept of the invention, a first modification to the isocyanate is carried out by the resin manufacturer (supplier) on an unsaturated polyester polyol resin to give rise to said prepolymer and the final user subsequently adds, to said prepolymer thus obtained (supplied by the resin manufacturer), the second isocyanate fraction necessary for the reaction with the OH functional groups of said prepolymer at the time of the formulating, for example of the SMC or BMC or another composition.

The mixture (formulation) produced by the user is then prepared in such a way that r=NCO/OH, expressed in equivalents, is set in a range varying from 0.6 to 1.1, where OH represents, within the broadest sense, all the functional groups which react with NCO of said prepolymer and optionally other components of the mixture which react with regard to said isocyanate.

As the isocyanate modification is split between the production of urethane polyol prepolymer resin and the manufacture of SMC or BMC or other, by the final formulator, this results in a consequent decrease in the exothermicity on the normal impregnating device, without the need for a cooling system in order to remove the heat given off. It is then possible to go back to standard impregnating devices without the risk of transferring the reaction exothermicity onto the SMC roll during the maturing stage.

Moreover, the unsaturated polyester resin, thus prethickened by the modification in the prepolymer form, results in better formulation convenience during the preparation of the SMC or BMC pastes or other formulation and in the elimination of the problems of draining or of overflow of the resin during the manufacture of the paste (more suitable viscosity).

Furthermore, the amount of isocyanate necessary to bring about the reaction of the urethane polyol prepolymer in formulation is significantly reduced in comparison with the conventional route (up to half in comparison with the conventional route). The process using the prepolymer according to the present invention is thus intrinsically less polluting and safer with regard to the aspect of the handling by the final formulator. This situation does not take into account another advantage relating to the improvement in the control of the reproducibility of the stages of maturing and molding the components, with better control and adjustment of the functionality and of the proportions of reactants and of the reaction in general.

The first prepolymer as described above carries hydroxyl and/or amine functional groups and can react with a polyisocyanate in an applicative formulation of SMC/BMC type, but in a reduced amount overall of isocyanate, owing to the fact that a portion of the isocyanate is already used in the preparation of said prepolymer, as constituent of said formulation.

According to a second concept, the prepolymer according to the invention carries free isocyanate end functional groups. Said prepolymer is prepared, and also stored before use, under an atmosphere which is inert with regard to the NCO functional groups. In this case, the final formulator has no need to use isocyanate, insofar as said prepolymer can replace it. According to this second operating concept, said prepolymer functionalized with free isocyanate (prepared and supplied by the resin manufacturer) can react either with a polyol resin (or resin of amine functionality), such as an unsaturated polyester polyol, or with a urethane polyol prepolymer, as described in the first operating concept according to the invention.

For the final formulator, the isocyanate-terminated prepolymer component is then mixed, either with the resin comprising hydroxyl and/or amine functionality of the type consisting of unsaturated polyester comprising a high $N_{OH}$ (hydroxyl number) or comprising a high $N_{NH2}$ (amine number) or with a hydroxyl- and/or amine-terminated prepolymer as defined according to the first concept, in proportions calculated in order to have a mixture produced by the user prepared in such a way that: r=NCO/OH, expressed in equivalents, is set in a range varying from 0.6 to 1.1, where OH represents all the functional groups which react with NCO which are present in said applicative formulation mixture, such as SMC/BMC.

This second route makes it possible, even more than in the case of the first route, to limit the exothermicities produced during the preparation of the SMC, to operate with higher starting viscosities in comparison with the conventional routes and, finally, to dispense with the use of a conventional isocyanate (poly-or diisocyanate) of low molecular weight exhibiting the abovementioned disadvantages during the formulating by the final user to produce the SMCs or BMCs or other hybrid formulations (which have, among their active components, a polyisocyanate and an unsaturated polyester).

Thus, the first subject matter of the present invention is an ethylenically unsaturated prepolymer comprising at least one ending X which reacts by condensation, chosen from hydroxyl and/or amine or free isocyanate groups, and optionally an ending X' possessing ethylenic unsaturation, more particularly with specific conditions r=NCO/(OH+NH$_2$) for the two types of prepolymers which follow: X=OH and/or NH$_2$ and X=free NCO.

A second subject matter of the invention is a specific process for the preparation of the prepolymer according to the invention which is a function of X.

The prepolymer capable of being obtained by reaction or which is the reaction product of at least one prepolymer defined according to the invention carrying X=free NCO with a reactive component comprising Y functional groups which react with said reactive X functional groups, also comes within the present invention.

The invention also covers a crosslinkable composition comprising at least one of said prepolymers as defined above.

The present invention also covers a process for the preparation of such a crosslinkable composition, said process comprising at least the stage of addition of at least one prepolymer according to the invention to said crosslinkable composition.

The use of at least one prepolymer of the invention or of a crosslinkable composition comprising it in molding compositions or applications, composites, including lightened composites, in particular foams, SMCs, BMCs, laminates, prepregs, coatings, mastics, adhesives, barrier coats, gel coats, IMCs, polyester concretes or artificial marbles and in the in situ repair of buried pipes, including oil pipes or water pipes, also comes within the invention.

Various more specific uses of said prepolymers and said crosslinkable compositions also come within the invention:
  the use of at least one prepolymer of the invention, free by modifying at least in part or quantitatively the X functional groups (such as X=free NCO), for the preparation of another functional prepolymer or in the preparation of mastics which can self-crosslink by the dual crosslinking route, with or without the possibility of additional radical crosslinking (with two routes), in the presence of atmospheric moisture (for X=free NCO) and at ambient temperature,
  the use of said prepolymers in the preparation of compositions which can crosslink by the peroxide or hyperperoxide route at low temperature in the presence of a decomposition accelerator or by heating at a higher temperature or under radiation in the presence or absence of a photoinitiator.

The invention also covers a process for employing a crosslinkable composition according to the invention, comprising at least one stage of application or of use by hand, with a gun, by impregnation, by filament winding, by pultrusion, by injection, by compression, by IMC infusion, by casting, by centrifuging, by RTM (Resin Transfer Molding) and by RIM (Reaction Injection Molding).

Finally, the last subject matter of the invention is a finished article obtained by crosslinking at least one crosslinkable composition of the invention which is selected from molded components (resulting from molding compositions), composites, including lightened composites, in particular foams, laminates, prepregs, mastics, adhesives, coatings, barrier coats, gel coats, IMCs, polyester concretes, artificial marbles, insulating sandwich panels, thermal and mechanical protective means (shields) and more particularly personal protective means and equipment (helmets, shields, safety footwear, and the like), gangway floors, windmill blades, motor vehicle parts, marine paints, mechanical parts or buried pipes, including oil pipes or water pipes.

Thus, the first subject matter of the present invention is an ethylenically unsaturated prepolymer comprising at least one ending X which reacts by condensation chosen from hydroxyl and/or amine or free isocyanate groups and optionally an ending X' having ethylenic unsaturation, said prepolymer having a number-average weight Mn (measured by GPC with polystyrene standards) ranging from 1000 to 5000, preferably from 1200 to 4500, and an X number (in the dilute state, in the presence of comonomers), expressed in mg KOH/g, ranging from 30 to 150, preferably from 35 to 120, with said prepolymer being capable of being obtained by reaction or being the reaction product of the following components A and B:

A) a first component A comprising the following mixture:
  i) at least one first ethylenically unsaturated resin carrying hydroxyl and/or amine reactive endings chosen from unsaturated polyesters having an OH number (measured on undiluted solid resin) of at least 45 mg KOH/g, preferably of 45 to 200 mg KOH/g and more preferably of 70 to 170 mg KOH/g, and an acid number (measured on resin in the undiluted solid state) of less than 10 mg KOH/g and/or from vinyl esters, said resin being diluted in at least one ethylenically unsaturated monomer (hereinafter also known as comonomer) which can copolymerize with the ethylenic unsaturation of said resin,
  ii) optionally at least one second resin, other than the resin i), chosen from:
    ethylenically unsaturated hydroxylated resins and preferably from unsaturated polyesters, unsaturated polyesteramides, unsaturated polyurethane esters or vinyl esters, diluted in at least one ethylenically unsaturated monomer, and/or
    hydroxylated and/or aminated saturated resins, diluted in at least one ethylenically unsaturated monomer, and/or
  iii) optionally at least one third reactive saturated resin chosen from polyether polyols or polyester polyols or polyamines or polyepoxides and more particularly from polyepoxides, such as bisphenol A diglycidyl ether (BADGE), the latter products making it possible to stabilize the prepolymer composition (prepolymer diluted in the monomer) on storage, in the case where the OH number of said resin i) lies in the lower part of the abovementioned range, and to avoid risks of unintentional gelling on storage, said resin iii) having a functionality of 2 or 3 and preferably a functionality of 2 and a molecular weight Mn of less than 400 g/mol, and
  iv) optionally at least one unsaturated monoalcohol, related to the optional presence of said ethylenic ending X', up to 30% in equivalents of the $OH+NH_2$ total and preferably less than 20% in equivalents of the $OH+NH_2$ total originating from i)+ii)+iii)+iv),
B) a second component B comprising at least one polyisocyanate with a functionality equal to or greater than 2 and which can range up to 3, preferably with a functionality of 2, and with, in the case where the functionality is greater than 2, either for the component A or for the component B, said prepolymers are obtained under conditions such that the proportions of A and B and the mean functionality of the reaction mixture of A and B satisfy the Macosko-Miller relationship, in order to avoid any risk of gelling by crosslinking.

Two types of prepolymers are thus obtained with, per functionality X chosen, the following necessary conditions:
  for X=OH and/or amine, with a ratio in equivalents $r=NCO/(OH+NH_2)$, ranging from 0.01 to 0.6, preferably from 0.2 to 0.5, and with said component B being added (preferably gradually) to said component A, and
  for X=free NCO, with a ratio in equivalents $r=NCO/(OH+NH_2)$, ranging from 1.2 to 3, preferably from 1.5 to 2.5, and with said component A being added (preferably gradually) to said component B.

The abovementioned Macosko-Miller relationship is as defined according to Macromolecules, vol. 9, pages 199-211 (1976), and is regarded as well known to a person skilled in the art. For greater clarity, this relationship is restated below, which relationship links the critical ratio (critical to the gel point) $r_c=NCO/(OH+NH_2)$ to the mean functionality (X) of A, $f_A$, and the mean functionality (X) of B, $f_B$, to the degree of conversion at the gel point $x_g$:

$$r_c * x_g^2 = 1/((f_B-1)*(f_A-1))$$

This means, for example, that, in the case of the prepolymer with X=free NCO, with the (gradual) addition of A to B (thus with r gradually decreasing from infinity down to approximately 1.2 at most) and for $f_A=2.3$, $f_B=2$ (mean functionalities of A and B set) and degree of conversion of 100%, it would be necessary to have an $r<r_c=0.76$ in order to have gelling. Thus, r will have to be much greater than $r_c$ (approximately 2 times greater) in order to avoid any risk of gelling.

In the converse case, of the prepolymer with X=OH and/or $NH_2$, with the (gradual) addition of B to A (thus with r changing from 0 to 0.6) and with the same mean functionalities $f_A$ and $f_B$ for x=1 (100% conversion), it will be necessary to have $r>r_c=0.76$ in order to have gelling. Thus, in order to avoid any risk of gelling, it will be necessary to operate with $r<<r_c=0.76$.

The term "functionality of greater than 2", either for A or for B, stated as specific case exhibiting a risk of gelling by crosslinking, should be interpreted here as meaning "mean functionality by number (of moles) of greater than 2", either for A or for B, in the case where either A or B is a mixture of at least two reactive constituents carrying X functional groups as defined above. Moreover, the Macosko-Miller relationship might be replaced by the equivalent alternative condition of obtaining said prepolymers with a mean functionality (X) by number (per mole of reactive X constituent) of the reaction mixture of A and B controlled in order to be less than or equal to 2. If $f_i$ is the functionality of a constituent i of the mixture (A+B here) and $n_i$ is the number of moles of this constituent i, in this case the mean functionality by number is $f_m = \Sigma_i n_i * f_i / \Sigma_i n_i$.

The term "reactive" in the expression "reactive ending X" means generally that the corresponding X number is greater than a number equivalent to 6 mg KOH/g when X=NCO and greater than 3 mg KOH/g when X=OH or $NH_2$.

Said prepolymer can have an equivalent weight per ethylenic unsaturation of the backbone of said prepolymer varying from 150 to 2000 g/mol, preferably from 170 to 1500 g/mol. This equivalent weight per unsaturation can be calculated directly from the mass balance of the reactive components (mixture of A and B).

The X number of said prepolymer, expressed in equivalents of mg KOH/g, can vary from 30 to 150 mg KOH/g and preferably from 35 to 120 mg KOH/g, this number being measured on the prepolymer in the state diluted by comonomers, which can range from 20 to 55%, preferably from 25 to 45%, by weight of comonomers with respect to the prepolymer+comonomers total weight.

The resins of type i), ii) and iii) according to the invention are diluted in at least one monomer carrying at least one ethylenically unsaturated functional group which can be chosen from vinyl and/or (meth)acrylic and/or allylic monomers. The level of this monomer can vary from 20 to 55% by weight and preferably from 25 to 40% by weight. This monomer is preferably selected from vinylaromatic monomers, such as styrene and its derivatives or vinyltoluenes, (meth)acrylate, allylic or maleate monomers, or polyfunctional (meth)acrylic monomers and/or oligomers.

The prepolymer of the invention can comprise a product or is composed of a product of the following general formula:

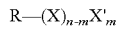

$$R-(X)_{n-m}X'_m$$

with: n ranging from 1.5 to 3 and preferably from 1.5 to 2.5, and
    m ranging from 0 to 0.5 and preferably from 0 to 0.3, and
    R being the overall radical resulting from the reaction of A with B, which carries said X endings and optionally X' endings, and
    with X=OH and/or amine or free NCO, and
    X'=ethylenic unsaturation, which can be (meth)acrylic, vinyl or allylic.

The X' unsaturation can be present both with the X=OH and/or amine functional groups and with X=free NCO and, in this case, the index m can vary between 0 and 0.5, preferably between 0 and 0.3 and more preferably from 0.01 to 0.3.

The level by weight of said prepolymer, with respect to the total weight of prepolymer+ethylenically unsaturated monomers, can vary between 45 and 80% and preferably between 60 and 75%, with a molecular weight Mn ranging from 1000 to 5000 g/mol and preferably from 1200 to 4500 g/mol. All the average molecular weights mentioned (Mn, Mw) are determined by GPC with polystyrene calibration (rates expressed as polystyrene equivalents). It is also possible to calculate the weight Mn (in this case calculated Mn) from the final functionality index (X). In this case, the calculated Mn can vary from 550 to 2500, which corresponds approximately to the Mn range measured via GPC as polystyrene equivalents from 1200 to 4500.

Said resin i) can represent from 70 to 100% by weight and said resin ii) can represent from 0 to 30% by weight or up to 30% by weight of the i)+ii)+iii) total weight, said resin i) having an equivalent weight per unsaturation which can range from 140 to 2000 g/mol and preferably from 140 to 1250 g/mol and said resin ii) having an equivalent weight per unsaturation which can range from 200 to 2500 g/mol and preferably from 200 to 1500 g/mol, measured by material balance (it corresponds to the total weight divided by the number of ethylenic unsaturations present).

When said resin iii) is present, it can represent from 1 to 15% by weight of the i)+ii)+iii) total weight.

Said resin i) or ii) can be at least one unsaturated polyester and/or at least one vinyl ester.

Said unsaturated polyester resins suitable for the invention can be based on at least one ethylenically unsaturated diacid or anhydride, such as maleic acid, maleic anhydride, fumaric acid, itaconic acid, itaconic anhydride, tetrahydrophthalic (THP) acid or tetrahydrophthalic anhydride, and may or may not be modified by dicyclopentadiene (DCPD). Optionally, at least one saturated dicarboxylic acid or anhydride can be present with said unsaturated diacid, such as orthophthalic acid, isophthalic acid, terephthalic acid or adipic acid, or a cycloaliphatic diacid or anhydride, such as the acid CHDA (cyclohexanedicarboxylic acid). Examples of such combinations between unsaturated and saturated diacids or anhydrides are isophthalic or orthophthalic or terephthalic/maleate polyesters, it being possible for said maleates to be modified or not modified by DCPD, and more preferably said hydroxylated unsaturated polyester resins are based on an acid component comprising at least maleic acid and/or anhydride with an aromatic acid and/or anhydride, such as terephthalic acid and/or anhydride, optionally with at least one other anhydride or acid from those mentioned above, preferably in a maleic/aromatic (such as terephthalic) molar ratio ranging from 0.6/0.4 to 0.4/0.6. In order to prepare said resins, said diacids or anhydrides react with at least one polyol, such as propylene glycol (PG), ethylene glycol (EG), diethylene glycol (DEG), neopentyl glycol (NPG), butyl ethyl propanediol (BEPD), butanediol, trimethylolpropane (TMP), dipropylene glycol (DPG), 2,2,4-trimethyl-1,3-pentanediol (TMPD) or 2-methyl-1,3-propanediol (MPD). The polyol component is in excess with respect to the acid component, between 10 and 30 mol %. The polyol component preferably comprises at least one $C_4$-$C_9$ polyol grafted with methyl and/or ethyl grafts, such as NPG, TMPD, BEPD or MPD. At least one linear diol is combined therewith, preferably EG and/or PG. Mention may be made, as preferred example of combination between linear and branched, of EG and/or PG with NPG and/or BEPD. Mention may be made, as example of preferred molar ratio, of a linear/grafted molar ratio ranging from 0.4/0.6 to 0.6/0.4.

Said vinyl esters suitable for the invention are the reaction products of a diepoxy, such as hydrogenated or nonhydrogenated bisphenol A diglycidyl ether (BADGE), epoxy novolac or a cycloaliphatic or aliphatic diepoxy, with an ethylenically unsaturated monoacid, such as (meth)acrylic acid, optionally in the presence of an ethylenically unsaturated diacid, such as maleic or itaconic acid, and optionally in the presence of other aromatic or (cyclo)aliphatic diacids, such as those mentioned above, as extending agents. The diepoxy can be alkoxylated with at least 1 to 3 alkoxy units, such as ethoxy and/or propoxy, per epoxy unit, before esterification, the functionality as end unsaturation preferably being 2.

Said polyisocyanate for the component B can be selected from MDI (diphenylmethane diisocyanate), IPDI (isophorone diisocyanate), $H_{12}$MDI (dicyclohexylmethane diisocyanate), TDI (toluene diisocyanate), HDI (hexamethylene diisocyanate), HDI (isocyanurate triisocyanate) triisocyanurate, or isocyanates which are uretidione, allophanate and biuret derivatives of the preceding diisocyanates.

As already mentioned above, according to a first possibility, the prepolymer of the invention carries a reactive functional group X=hydroxyl and/or amine, in which case the r=NCO/(OH+$NH_2$) ratio in equivalents for the reaction of A with B varies from 0.1 to 0.6 and preferably from 0.2 to 0.5, with the gradual addition of the component B to the component A (excess of OH). In this case, a stabilizer can be used, such as hydroquinone or its derivatives or sterically hindered phenols, for example di(tert-butyl)-para-cresol or di(tert-butyl)hydroxyanisole or mono(tert-butyl)-hydroquinone, in an amount which can range from 10 to 500 ppm and preferably from 30 to 300 ppm.

According to the second possibility, the reactive functional group X is a free isocyanate, in which case the r=NCO/(OH+$NH_2$) ratio in equivalents can vary from 1.2 to 3 and preferably from 1.5 to 2.5. The preferred stabilizer in this case is a BHT+PTZ (phenothiazine) combination in an amount ranging from 20 to 1000 ppm and preferably from 60 to 700 ppm.

The second subject matter of the invention is a process for the preparation of the prepolymer of the invention. Depending on the functionality X, this process comprises the following successive stages:
    for X=OH and/or $NH_2$:
        charging the component A as defined above as reactor heel, with control of the water content in order not to exceed 1000 ppm and preferably less than 600 ppm,
        addition, preferably gradual, of the component B to said component A, so as to have an OH+$NH_2$ excess corresponding to an r=NCO/(OH+$NH_2$) ratio in equivalents varying from 0.1 to 0.6 and preferably from 0.2 to 0.5, optionally or if necessary in the presence of a catalyst of the reaction of the OH functional groups with the NCO functional groups, reaction until virtually complete disappearance of the NCO groups, corresponding here to an NCO number (in the dilute state) equivalent to ≤6 mg KOH/g, under conditions of absence of any risk of gelling by crosslinking, as described above, optionally, addition of a stabilizer, for X=free NCO:

charging, as reactor heel, said component B comprising said polyisocyanate in the presence of at least one ethylenically unsaturated monomer as defined above, for which monomers the water content will have been controlled beforehand, before the addition of the isocyanate, so as not to exceed 10 ppm, if necessary by a consumption reaction (consumption of the water) with a monoisocyanate, such as tosyl isocyanate, controlling the water content of the component A, so as not to exceed 1000 ppm and preferably 500 ppm, if necessary, reducing the water content of the component A by a consumption reaction with a monoisocyanate, addition, preferably gradual, of the component A to said component B comprising said excess polyisocyanate as reactor heel, with an r=NCO/(OH+NH$_2$) ratio in equivalents varying from 1.2 to 3 and preferably from 1.5 to 2.5, reaction until virtually complete disappearance of the OH groups (and equivalent groups), which corresponds here to a number (in the dilute state) equivalent to ≤3 mg KOH/g, under conditions of absence of any risk of gelling by crosslinking, as described above, and optionally, in the reaction stage, presence of a catalyst of the reaction of the OH functional groups with the NCO functional groups, and optionally, stabilization by addition of a stabilizer, as defined above, the preparation and the storage of said prepolymer taking place under conditions of an atmosphere which is inert (unreactive atmosphere, with controlled water content) with regard to said polyisocyanate.

The conditions of absence of any risk of gelling are to be incorporated in the conditions of this process, as already described above relating to the preparation of said prepolymers, the Macosko-Miller relationship having to be satisfied in order to avoid any risk of gelling by crosslinking during the condensation reaction of —OH and/or of —NH$_2$ with —NCO.

Said reaction can be carried out at a temperature ranging from 20 to 65° C.

The reaction catalysts which can be used are dibutyltin dilaurate, tin octoate and zinc acetate, the preferred catalyst being dibutyltin dilaurate, in an amount varying between 0 and 3000 ppm.

Another subject matter of the invention is another prepolymer capable of being obtained by reaction, for at least partial modification, which in this case can range from 1 to 99% of the X functional groups, or quantitative (100%) modification, of at least one prepolymer carrying X=free NCO functional groups, as defined above, with at least one reactive component comprising Y functional groups which react with said X functional groups and more particularly with at least one monoalcohol carrying at least one ethylenic unsaturation, so that said modified prepolymer carries ethylenically unsaturated urethane end functional groups. In fact, said modification is a reaction which makes it possible to convert the X end functional groups to ethylenically unsaturated endings via a urethane bond.

Preferably, said X functional groups are quantitatively converted to urethane end bonds carrying at least one ethylenic unsaturation.

With this aim, said monoalcohol can be selected from hydroxyalkyl (meth)acrylates, allylic alcohols, vinyl alcohols, hydroxyalkyl poly(meth)acrylates (in other words, (meth)acrylic multiester monoalcohols), or derivatives of these unsaturated alcohols, or hydroxylated unsaturated hemiester derivatives of a saturated dicarboxylic acid, such as phthalic acid, or unsaturated dicarboxylic acid, such as maleic acid.

Another subject matter of the invention is a crosslinkable resin composition, which can crosslink preferably by a double route involving a radical reaction and/or condensation of isocyanate with another functional group which reacts with said isocyanate, said composition comprising at least one prepolymer as defined according to the invention or obtained according to the process of the invention. Such a composition can be an applicative formulation, such as a molding composition, composites, including lightened composites, such as foams, SMCs, BMCs, laminates, prepregs, coatings, mastics, adhesives, barrier coats, gel coats, IMCs, polyester concretes or artificial marbles, or an intermediate composition before the final formulating.

According to a specific case of the invention, said composition comprises at least one prepolymer capable of being obtained from a component A comprising a resin of type i) or ii) chosen from at least one unsaturated polyester and/or at least one vinyl ester and which carries hydroxyl functional groups. An example of vinyl ester which is preferred in this case is a BADGE di(meth)acrylate, preferably diluted in an ethylenically unsaturated monomer selected from tripropylene glycol, ethylene glycol (EG), diethylene glycol (DEG), neopentyl glycol (NPG), butyl ethyl propanediol (BEPD) or butanediol di(meth)acrylates or from poly(meth)acrylates, such as trimethylolpropane tri(meth)acrylate (TMPTA) or pentaerythritol tetra(meth)acrylate. The presence of such a vinyl ester improves in particular the stability on storage of said composition while avoiding risks of unintentional gelling on storage, more particularly when the OH number of the starting resin lies in the lower N$_{OH}$ part, of between 45 and 55, of the broadest range mentioned (N$_{OH}$ of at least 45).

According to another possibility, said crosslinkable composition of the invention comprises at least one prepolymer comprising an X=OH and/or NH$_2$ ending. This type of composition additionally comprises at least one polyisocyanate with a functionality ranging from 2 to 3 and optionally other polyol or polyamine or polyepoxide compounds which react with said polyisocyanate, so that the r=NCO/(OH+NH$_2$) ratio in equivalents in the composition varies from 0.6 to 1.1. This type of composition can also be devoid of any other coreactant with as sole presence that of at least one prepolymer of the invention.

According to another possibility, said composition comprises at least one prepolymer comprising an X=free NCO ending. In this case, the coreactant of this prepolymer in this composition can be an unsaturated polyol resin (or resin having amine functionality), such as an unsaturated polyester polyol or a vinyl ester or a urethane polyol prepolymer, as described in the first operating concept according to the invention (X=OH and/or NH$_2$), and optionally other saturated coreactants from polyols, polyamines or polyepoxides.

Another possibility consists of a composition comprising at least the two types of prepolymers according to the invention, one being the prepolymer comprising X=OH and/or NH$_2$ endings and the other being the prepolymer comprising X=free NCO endings. According to a preferred form, the two prepolymers of the invention alone are the sole coreactant constituents of said crosslinkable composition. In such a case, in addition to the advantages mentioned above, the disadvantage related to the handling of the polyisocyanate by the final formulator no longer exists, insofar as the handling of the polyisocyanate is completely eliminated and with it the risks related to health, safety and the environment.

An alternative form of said composition can also comprise at least one prepolymer capable of being obtained by a reaction for partial or quantitative modification of the prepolymer comprising X=free NCO endings with an unsaturated monoalcohol as defined above. In this case, the end X functional groups are preferably converted to end unsaturations with urethane bridges, the use of such prepolymers making it possible to control and improve the effectiveness of the radical crosslinking reaction, with a crosslinking network which is more controlled as a result of the end unsaturations of said prepolymer. In this case, the mechanical performances in terms of modulus, of HDT (heat deflection temperature) and of resistance to water are found to be significantly improved.

Such a crosslinkable composition comprising at least one prepolymer as defined according to the invention can be a molding composition, composites, including lightened composites, such as foams, SMCs, BMCs, laminates, prepregs, mastics, adhesives, coatings, barrier coats, gel coats, IMCs, polyester concretes or artificial marbles.

Said composition can thus be reinforced with glass fibers and/or other reinforcing fillers and/or other normal additives well known to a person skilled in the art, fillers, such as calcium carbonate, rheology additives of $SiO_2$ type or of organic clay type, antifoaming agents, LSE (Low Styrene Emission), LP (Low Profile) and LS (Low Shrink) additives and internal mold release agents.

More particularly, the crosslinkable composition of the invention can be a coating composition, preferably a gel coat, barrier coat or IMC composition, with the specific advantages of a better surface appearance, better mechanical strength and better resistance to water.

These compositions can comprise at least one initiating system selected from peroxides or hydroperoxides, low-temperature redox systems and/or photoinitiators, which are well known to a person skilled in the art, according to the application targeted and the working process chosen.

Another subject matter of the invention is a process for the preparation of said crosslinkable composition according to the invention, said process comprising at least the stage of addition by mixing of at least one prepolymer according to the invention to said crosslinkable composition. The addition is carried out in the form diluted in an ethylenically unsaturated monomer as defined above, which addition is followed by mixing/homogenizing the composition, before the optional addition of glass fibers.

The use of the prepolymers of the invention in crosslinkable compositions, such as molding compositions, composites, lightened composites, including foams, SMCs, BMCs, laminates, prepregs, mastics, adhesives, coatings, barrier coats, gel coats, IMCs, polyester concretes or artificial marbles, and in the in situ repair of buried pipes, including oil pipes or water pipes, may require the use of various working processes, such as application: by hand, with a gun, by impregnation, by filament winding, by pultrusion, by injection, by compression, by IMC infusion, by casting, by centrifuging, by RTM and by RIM.

Mention may be made, among some more specific uses, of the use of at least one prepolymer comprising X=free NCO endings, in addition to the preparation of another modified prepolymer comprising X endings converted to urethane end unsaturations, in the preparation of mastics which can self-crosslink in the presence of atmospheric moisture at ambient temperature (by reaction of the NCO functional groups with atmospheric moisture).

Other uses are the preparation of coatings, gel coats, barrier coats, mastics, adhesives, IMCs, polyester concretes or artificial marbles which can crosslink by the peroxide or hydroperoxide route at low temperature in the presence of at least one decomposition accelerator, or by heating at a higher temperature, or under radiation in the presence of a photoinitiator (for example under UV radiation) or without a photoinitiator (under electron beam EB radiation).

Mention may thus be made, among possible applications, of molding compositions, composites, including lightened composites, such as foams, SMCs, BMCs, laminates, prepregs, coatings, mastics, adhesives, barrier coats, gel coats, IMCs, polyester concretes or artificial marbles.

More specific applications relate to applications for motor vehicles, marine paints, mechanical parts, refrigerated truck sandwich panels, thermal and mechanical protection, bathroom installations (shower trays or baths), personal protective equipment, shields or protective panels, helmets or protective footwear, buried pipes, including oil pipes or water pipes, in construction/building, or external surfaces (skin) of cosmetic quality for motor vehicle or transporting truck application.

Another subject matter of the invention relates to the process for working a composition according to the invention. Said working can comprise at least one stage of application or working by hand, with a gun, by impregnation, by filament winding, by pultrusion, by injection, by compression, by IMC infusion, by casting, by centrifuging, by RTM and by RIM.

Finally, a final subject matter of the invention is a finished article obtained by crosslinking at least one crosslinkable composition defined according to the invention, which is selected from molding compositions (molded components), composites, more particularly lightened composites, such as foams, laminates, prepregs, mastics, adhesives, coatings, barrier coats, gel coats, IMCs, polyester concretes, artificial marbles, insulating sandwich panels, thermal and mechanical protective means, personal protective equipment (shields, helmets, footwear), windmill blades, motor vehicle parts, marine paints, mechanical parts or buried pipes, including oil pipes or water pipes.

The following examples demonstrate by way of illustration of the invention, without any limitation, the performances of the prepolymers and resin compositions obtained.

I/ Tests and Methods of Characterization

1) Water Content

Evaluation according to the NFT 20-052 and ISO 760 standards on a Karl Fischer automatic titrating device of Metrohm KF 658 type.

2) Volatiles Content

Evaluation by evaporation under infrared heating, using a Mettler LP 16 dryer and a PM 10 balance. 2 g of resin to be analyzed are introduced into an untreated aluminum pan and then heated at 160° C. for 35 min.

3) Assaying the Styrene by Gas Chromatography (GC)

Evaluation by GC on an HP 5890 chromatograph, with an AT-1 Alltech (ref: 13640) capillary column and a 10-microliter syringe. Analytical conditions: oven temperature: 40° C. for 5 min and then 5° C./min up to 220° C., injector temperature: 230° C., detector temperature: 250° C.

4) Hydroxyl Number

Evaluation on a Metrohm titrator having the reference Titrando 809 with a Dosino 800 dosing unit (electrode LiCl saturated in EtOH and Ti Stand 804 propeller stirrer) coupled to Tiamo software.

5) Acid Number

Evaluation according to the ISO 2114 standard on a Metrohm titrator having the reference Titrando 809 with a Dosino 800 dosing unit (electrode LiCl saturated in EtOH and Ti Stand 804 propeller stirrer) coupled to Tiamo software.

6) Isocyanate Number

The isocyanate number is determined by reaction of excess dibutylamine with the isocyanate functional groups of the resin, followed by back titration with hydrochloric acid of the dibutylamine which has not reacted with the isocyanate functional groups.

The amount of dibutylamine consumed by the resin is determined by difference from a blank titration (without resin), according to:

$$N_{NCO} \text{ (in mg KOH/g)} = [(V_B - V_S) * NT * 56.1)]/W, \text{ with:}$$

$V_S$: volume of titrant run in for the titration of the sample (ml),
$V_B$: volume of titrant run in for the titration of the blank (ml),
NT: normality of the titrant (0.1N), W: weight of the sample (g).

7) Brookfield Viscosity

Evaluation of the viscosity at 25° C. on a Brookfield viscometer. The measurements were carried out on a Brookfield DV III+ viscometer with a spindle 3 and at a speed of 50 revolutions/minute.

8) GPC Measurements (Polystyrene Calibration)

Equipment used: solvent (THF) feeding system: Waters 610 pump, 600 E controller, Waters 717+ automatic injector, Waters R 410 refractive index detector, ovens temperature-regulated at 35° C. for the columns.

Columns used: set of 6 Waters columns of Styragel HR type with different porosities: 10 000 Å (1 column), 1000 Å (1 column), 500 Å (2 columns), 100 Å (1 column) and 50 Å (1 column).

Measurement conditions: sample of approximately 180 mg with dilution in 20 ml of THF, injection of 150 μl with an analytical time: 72 min.

II/ Starting Materials

A) Starting Materials Participating in the Composition of the Prepolymers

| Compound | Chemical nature | Name of the product | Supplier |
|---|---|---|---|
| Monoethylene glycol | — | — | Helma AG |
| Monopropylene glycol | — | — | Dow |
| Neopentyl glycol | — | — | BASF |
| Dipropylene glycol | — | — | Dow |
| Fumaric acid | — | — | Atochem |
| Terephthalic acid | — | — | BP |
| Isophthalic acid | — | — | Lonza |
| Maleic anhydride | — | — | Cray Valley |
| Styrene | — | — | Atochem |
| MDI | Diphenylmethane diisocyanate | Desmodur 2460M | Bayer |
| H$_{12}$MDI | Dicyclohexyl-methane diisocyanate | Desmodur W | Bayer |
| IPDI | Isophorone diisocyanate | Desmodur I | Bayer |
| Vinyl ester (epoxy MA) | — | CN 151 | Sartomer |
| MFA monomer | — | SR 206 | Sartomer |
| HEMA | Hydroxyethyl methacrylate | HEMA | Degussa |
| Tosyl isocyanate | — | Additive Ti | Borchers |
| BHT | Di(tert-butyl)-para-cresol | Lowinox BHT | Great Lakes |
| Naphthoquinone | — | — | VWR |
| PTZ | Phenothiazine | — | Avecia |

B) Starting Materials Participating in the Applicative Formulations

| Constituent | Function | Chemical nature | Supplier |
|---|---|---|---|
| MDI | Chemical maturing agent | Diphenylmethane diisocyanate with an NCO functionality >2 Desmodur VH20 grade | Bayer |
| PBQ | Stabilizer | para-Benzoquinone | Eastman |
| TBPEH LAM$_2$ | Radical initiator | tert-Butyl peroxy-2-ethylhexanoate | Degussa |
| Calcium carbonate | Filler | — | Omya |
| Zinc stearate | Internal mold release agent | — | CECA |
| P204 glass fibers 4800 tex 25 mm | Reinforcing filler | — | Vetrotex |
| Byk 515 | Antifoaming agent | — | BYK Chemie |
| Luperox MC | Radical initiator | tert-Amyl 2-ethylhexyl monoperoxycarbonate | Arkema |
| Standard pigment paste | Colorant | — | Cray Valley |

III/ Synthesis of the Starting Resins and of the Prepolymers According to the Invention The physicochemical characteristics of these resins and prepolymers are presented in table 1a, their specific mechanical properties are presented in table 1b and their resistance to water is presented in table 1c.

EXAMPLE 1

Synthesis of the Starting Resin A'

170 g of monoethylene glycol (2.74 mol), 275 g of neopentyl glycol (2.64 mol), 285 g of fumaric acid (2.45 mol) and 270 g of terephthalic acid (1.62 mol) are introduced into a conventional installation for synthesis. The mixture is heated to 220° C. and, when this temperature has been reached, the reaction is continued under isothermal conditions up to an $N_A < 3$ mg KOH/g. The mixture is subsequently diluted with 33% of stabilized styrene.

EXAMPLE 2

Synthesis of the Starting Resin B'

104.6 g of monopropylene glycol (1.37 mol), 424.6 g of dipropylene glycol (3.17 mol), 318.6 g of maleic anhydride (3.25 mol) and 152.2 g of isophthalic acid (0.92 mol) are introduced into an installation like that of example 1. The mixture is heated to 220° C. and, once the temperature has been reached, the reaction is continued under isothermal conditions up to an $N_A$<10 mg KOH/g. The mixture is subsequently diluted with 31% of stabilized styrene.

EXAMPLE 3

Synthesis of the Prepolymer A (NCO eq./OH eq.=0.37)

819 g of resin B' ($N_{OH}$=49.8 mg KOH/g and water content <700 ppm) are introduced at 25° C. into an installation like that of example 1. Heating is carried out at 40° C. and 33.6 g of MDI with an isocyanate functionality equal to 2 are introduced in two portions, the exothermicity of the reaction being allowed to develop and the temperature of the reaction medium being controlled in order for it not to exceed 55° C. After the exotherm, the temperature of the medium is maintained at 40° C. and the reaction is continued until the criterion for halting the reaction is achieved: $N_{NCO}$ of between 4 and 6 mg KOH/g. Then, after having brought the reaction medium back to 25° C., 147.4 g of a mixture of CN 151/SR 206 (70/30 by weight) are added, the viscosity is then adjusted to approximately 20 poises with styrene and, finally, an NCO number of 2.9 mg KOH/g is obtained.

Figure 2:
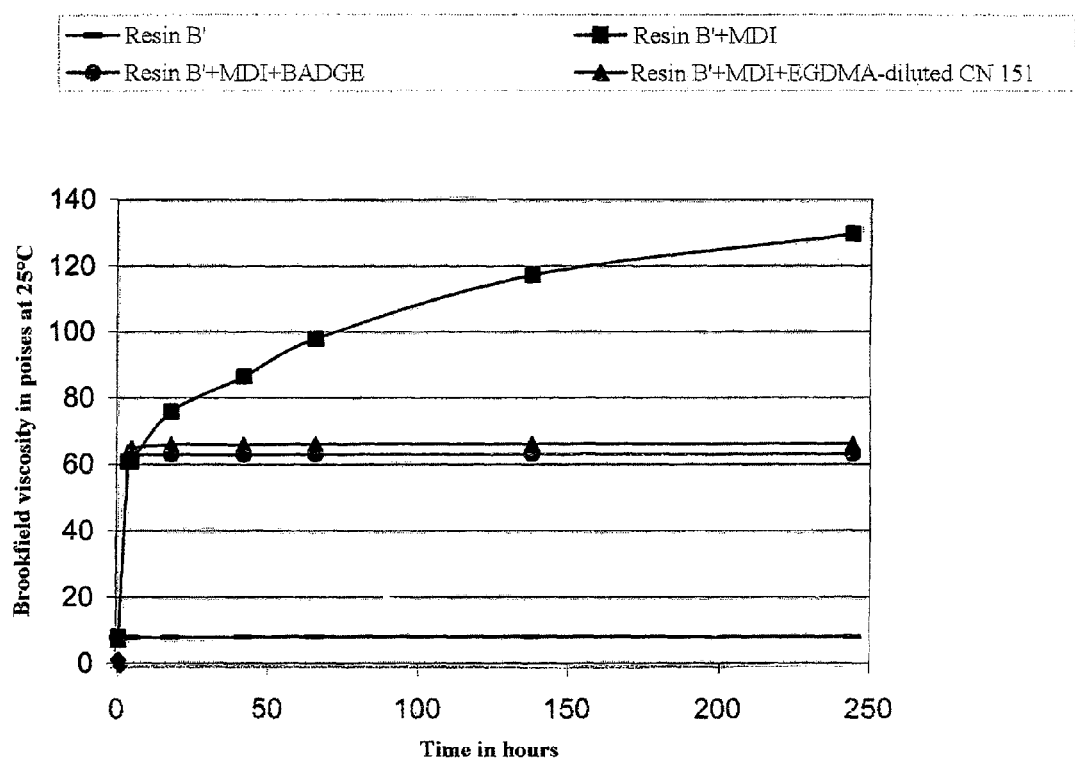
FIG. 2 is a graphical depiction showing the effect on the same stability, of the presence of the mixture CN 151/SR 206 in prepolymer A.

FIG. 2 shows the effect of improving the stability on storage of said prepolymer by the presence of the vinyl ester mentioned.

EXAMPLE 4

Synthesis of the Prepolymer B (NCO eq./OH eq.=0.3)

863.5 g of resin A' ($N_{OH}$=98.6 mg KOH/g and water content <500 ppm) are introduced at 25° C. into an installation like that of example 1. 28.2 g of HEMA are then introduced, the temperature of the medium is then raised to 40° C. and 58.3 g of MDI with an isocyanate functionality equal to 2 are introduced in two portions, the exothermicity of the reaction being allowed to develop and the temperature of the reaction medium being controlled in order to prevent it from exceeding 55° C.

After the exotherm, the temperature of the medium is maintained at 40° C. and the progress of the reaction is monitored as isocyanate number until the criterion for halting the reaction is achieved: $N_{NCO}$<6 mg KOH/g.

Then, after having brought the reaction medium back to 25° C., 50 g of styrene are added in order to cause the viscosity of the prepolymer to return to 20 poises.

EXAMPLE 5

Synthesis of the Prepolymer C (NCO eq./OH eq.=0.4)

802 g of resin A' ($N_{OH}$=98.6 mg KOH/g and water content <500 ppm) are introduced at 25° C. into an installation like that of example 1. 26 g of HEMA are then introduced, the temperature of the medium is then raised to 40° C. and 81.2 g of MDI with an isocyanate functionality equal to 2 are introduced in two portions, the exothermicity of the reaction being allowed to develop and the temperature of the reaction medium being controlled in order to prevent it from exceeding 55° C. After the exotherm, the reaction is continued until the criterion for halting is achieved, as in example 4.

After cooling to 25° C., 90.3 g of styrene are added in order to adjust the viscosity to 20 poises and approximately 500 ppm of naphthoquinone are added in order to provide the product with stability on storage.

EXAMPLE 6

Synthesis of the Prepolymer D (NCO eq./OH eq.=0.4)

805 g of resin A' ($N_{OH}$=95.2 mg KOH/g and water content <500 ppm) are introduced at 25° C. into an installation like that of example 1. 28.2 g of HEMA are then introduced, the temperature of the medium is then raised to 40° C. and 83 g of $H_{12}$MDI with an isocyanate functionality equal to 2 are introduced in two portions, in the presence of 500 ppm of DBTDL, the exothermicity of the reaction being allowed to develop and the temperature of the reaction medium being controlled in order for it not to exceed 55° C. After the exotherm, the reaction is continued until the criterion for halting is achieved, as in example 4.

After cooling to 25° C., 84 g of styrene are added in order to adjust the viscosity of the prepolymer to approximately 20 poises, with stabilization as for example 5.

EXAMPLE 7

Synthesis of the Prepolymer E (NCO eq./OH eq.=0.4)

816.3 g of resin A' ($N_{OH}$=95.2 mg KOH/g and water content <500 ppm) are introduced at 25° C. into an installation like that of example 1. 28.6 g of HEMA are then introduced, the temperature of the medium is then raised to 40° C. and 71.2 g of IPDI with an isocyanate functionality equal to 2 are introduced in two portions, the exothermicity of the reaction being allowed to change and the temperature of the reaction medium being controlled in order for it not to exceed 55° C. After the exotherm, the reaction is continued until the criterion for halting is achieved, as in example 4.

After cooling to 25° C., 84 g of styrene are added in order to adjust the viscosity of the prepolymer to approximately 15 poises and the prepolymer is stabilized with 500 ppm of naphthoquinone in order to provide the product with stability on storage.

EXAMPLE 8

Synthesis of the Prepolymer F (NCO eq./OH eq.=2.36)

215.8 g of styrene (water content <200 ppm) are introduced at 25° C. into a conventional installation for synthesis, followed by 4.3 g of tosyl isocyanate. 200 ppm of BHT and 250 ppm of PTZ are then introduced, followed by 267 g of MDI, the temperature of the reaction medium being allowed to change up to 50° C. 517.2 g of resin A' ($N_{OH}$=98.6 mg KOH/g and water content <500 ppm) are subsequently added continuously, without exceeding the temperature of 65° C. The progress of the reaction is monitored as isocyanate number until the criterion for halting the reaction is achieved: $N_{NCO}$ situated between 64 and 66 mg KOH/g. The medium is subsequently cooled to 25° C. The product is subsequently stored under nitrogen (with the exclusion of moisture).

EXAMPLE 9

Synthesis of the Prepolymer G (NCO eq./OH eq.=2.36)

215.8 g of styrene (water content <200 ppm) are introduced at 25° C. into a conventional installation for synthesis, followed by 5 g of tosyl isocyanate. 200 ppm of BHT and 250 ppm of PTZ are then introduced, followed by 269.9 g of $H_{12}MDI$ and 2000 ppm of DBTDL, the temperature of the reaction medium being allowed to change up to 50° C. 514.3 g of resin A' ($N_{OH}$=95.2 mg KOH/g and water content <500 ppm) are added continuously, without exceeding the temperature of 65° C. The progress of the reaction is monitored as isocyanate number until the criterion for halting the reaction is achieved: $N_{NCO}$ situated between 53 and 56 mg KOH/g. The medium is subsequently cooled to 25° C. The product is subsequently stored under nitrogen (with the exclusion of moisture).

EXAMPLE 10

Synthesis of the Prepolymer H(NCO eq./OH eq.=2.36)

215.8 g of styrene (water content <200 ppm) are introduced at 25° C. into a conventional installation for synthesis, followed by 5 g of tosyl isocyanate. 200 ppm of BHT and 250 ppm of PTZ are then introduced, followed by 241 g of IPDI and 1000 ppm of DBTDL, the temperature of the reaction medium being allowed to change up to 50° C. 542.9 g of resin A' ($N_{OH}$=95.2 mg KOH/g and water content <500 ppm) are added continuously, without exceeding the temperature of 65° C. The progress of the reaction is monitored as isocyanate number until the criterion for halting the reaction is achieved: $N_{NCO}$ situated between 66 and 69 mg KOH/g. The medium is subsequently cooled to 25° C. The product is subsequently stored under nitrogen.

EXAMPLE 11

Synthesis of the Prepolymer I, which is the HEMA-Modified Prepolymer H 862 g of the prepolymer H ($N_{NCO}$=68 mg KOH/g) and 2000 ppm of DBTDL are introduced into a conventional installation for synthesis, the temperature of the reaction medium being allowed to change up to 50° C. 135.8 g of HEMA ($N_{OH}$=431.53 mg KOH/g) are added in two portions, without exceeding the temperature of 65° C. The progress of the reaction is monitored as isocyanate number until the criterion for halting the reaction is achieved: $N_{NCO} \leq 2$ mg KOH/g.

EXAMPLE 12

Synthesis of the Prepolymer J, which is the HEMA-Modified Prepolymer F 862 g of the prepolymer F ($N_{NCO}$=65 mg KOH/g) are introduced into a conventional installation for synthesis, the temperature of the reaction medium being allowed to change up to 50° C. 129.6 g of HEMA ($N_{OH}$=431.53 mg KOH/g) are added in two portions, without exceeding the temperature of 65° C. The progress of the reaction is monitored as isocyanate number until the criterion for halting the reaction is achieved: $N_{NCO} \leq 5$ mg KOH/g.

EXAMPLE 13

Synthesis of the Prepolymer K 854 g of resin B' ($N_{OH}$=49.8 mg KOH/g and water content <700 ppm) are introduced at 25° C. into a conventional installation for synthesis. Heating is carried out to 40° C. and 35.1 g of MDI with an isocyanate functionality equal to 2 are introduced in two portions, the exothermicity of the reaction being allowed to develop and the temperature of the reaction medium being controlled in order not to exceed 55° C. After the exotherm, the temperature is maintained at 40° C., the reaction being continued until an $N_{NCO}$ of between 4 and 6 mg KOH/g (criterion for halting) is achieved. After cooling to 25° C., 111 g of BADGE are added and a final $N_{NCO}$ of 3.4 mg KOH/g is achieved. The effect of this addition on the stability of the prepolymer is presented in the appended FIG. 1.

TABLE 1a

Physicochemical characteristics of the starting resins and of the prepolymers according to the invention

| Characteristics | A' | B' | A | B | C | D | E |
|---|---|---|---|---|---|---|---|
| Water content (ppm) | 460 | 540 | 810 | 544 | 600 | 380 | 460 |
| Styrene content (%) | 33 | 31.1 | 31.2 | 31.2 | 32.4 | 33 | 35 |
| Hydroxyl number (mg KOH/g) | 98.6 | 49.8 | 44.5 | 68.9 | 52.9 | 52.4 | 64 |
| Acid number (mg KOH/g) | 1.4 | 6 | 5.6 | 1.2 | 1.8 | 2 | 1.5 |
| Isocyanate number (mg KOH/g) | | | 2.9 | 2.6 | 4.8 | 4.5 | 3.1 |
| Viscosity (poises) | 7.3 | 8.6 | 22.7 | 20.6 | 20.1 | 21.2 | 14 |
| GPC (polystyrene calibration) | | | | | | | |
| Mn (g/mol) | 1489 | 2342 | 2300 | 1995 | 2130 | 2325 | 2160 |
| Mw (g/mol) | 4034 | 13 503 | 39 180 | 5940 | 7071 | 11 490 | 7290 |
| I | 2.71 | 5.77 | 17 | 2.98 | 3.32 | 4.94 | 3.38 |
| Mn calculated via $N_x$ | 752 | 1390 | 1534 | 1103 | | | |

TABLE 1a-continued

Physicochemical characteristics of the starting resins and of the prepolymers according to the invention

| Characteristics | F | G | H | I | J | K |
|---|---|---|---|---|---|---|
| Water content (ppm) | 250 | 175 | 140 | 174 | 300 | 700 |
| Styrene content (%) | 35 | 35 | 43 | 39.5 | 32.4 | 25 |
| Hydroxyl number (mg KOH/g) | 1 | 1.1 | 2.2 | 2.5 | 2.1 | 28.5 |
| Acid number (mg KOH/g) | 1 | 1 | 1.6 | 1.2 | 1 | 6.2 |
| Isocyanate number (mg KOH/g) | 65 | 55 | 68 | 1 | 4.2 | 3.4 |
| Viscosity (poises) | 15 | 23 | 3.4 | 7.2 | 62.4 | 63 |
| GPC (polystyrene calibration) | | | | | | |
| Mn (g/mol) | 2555 | — | 2075 | 1780 | 1780 | — |
| Mw (g/mol) | 10 922 | — | 6535 | 6500 | 10 220 | — |
| I | 4.3 | — | 3.15 | 3.65 | 5.74 | — |
| Mn calculated via $N_x$ | 1105 | 1303 | 904 | | | |

TABLE 1b

Mechanical characteristics of the starting resins and of the prepolymers according to the invention

| Characteristics | A' | B' | A | B | C | E | F* | I | J | K |
|---|---|---|---|---|---|---|---|---|---|---|
| BENDING | | | | | | | | | | |
| Modulus (MPa) | 3250 | 3225 | 3445 | 3550 | 3550 | 3500 | 3800 | 3400 | 3350 | 3215 |
| Stress (MPa) | 115 | 102 | 110 | 125 | 135 | 110 | 135 | 115 | 130 | 110 |
| Deflection (mm) | 7.45 | 7.5 | 6.5 | 7.8 | 8.4 | 5.6 | 7.7 | 7 | 9.3 | 7.7 |
| HDT (° C.) | 83.5 | 90 | 104 | 95 | 100 | 97 | 117 | 120 | 123 | 70 |
| Charpy impact (kJ/m$^2$) | 6.8 | 9 | — | — | 11 | 9.8 | — | 13.1 | 15.8 | — |

F*: corresponds to a mixture of prepolymers C and F in a ratio by weight of 2/1

Procedure for the Preparation of the Test Plaques:

Pure resin with 0.15% of Co octoate at 6% and 1.2% of methyl ethyl ketone peroxide at 50% in diisobutyl phthalate is diluted to 40% with styrene and crosslinked in the form of a plaque and then post-cured according to: 16 h at 80° C., followed by 2 h at 120° C. The mechanical performances (3-point bending according to ISO 178 and Charpy impact strength according to ISO 179) and the thermomechanical performance (HDT according to ISO 75-2) are evaluated. See results in table 1b.

TABLE 1c

Resistance to hydrolysis of the resins and of the prepolymers according to the invention The results presented below correspond to those obtained by immersing, for 100 hours at 100° C., resin or prepolymer plaques produced under the conditions mentioned above for carrying out the mechanical tests. After this immersion, the increase in weight of the plaque due to the absorption of water is then measured.

| References of comparative commercial resins, of the starting resin A' and of the prepolymers according to the invention | % by weight of water absorbed after 100 hours at 100° C. |
|---|---|
| Norsodyne ® S05820 (bisphenol resin) | 1.90 |
| Norsodyne ® G703 (iso resin) | 1.28 |
| A' | 2.82 |
| C | 1.68 |
| E | 1.84 |
| I | 1.52 |
| J | 1.07 |

The prepolymers according to the invention have a markedly better resistance to water in comparison with the starting resin, which exhibits a low resistance to water, and they have a resistance which is at least as good, and even better, with respect to the commercial resins Norsodyne® SO5820 (bisphenol resin) and Norsodyne® G703 (iso resin) acting as reference in our range for their good resistance to hydrolysis.

These better performances are especially worthwhile when the urethane-isocyanate prepolymer is functionalized by (meth)acrylate endings which make it possible to reinforce even more the resistance to hydrolysis, in particular for coating applications, such as gel coats or barrier coats.

IV/ Evaluation of the Applicative Formulations

The applicative evaluations of the prepolymers according to the invention are first carried out on formulations comprising neither fibers nor fillers (see results tables 2a and 2b) and subsequently on BMC formulations (see results tables 3a and 4a) and SMC formulations (see results tables 3b and 4b).

The compositions of the various formulations are presented in tables 2a, 3a and 3b.

The progress of the exothermicity and of the viscosity as a function of reaction time are presented in table 2b.

The mechanical performances of the BMC formulations (of table 3a) and of the SMC formulations (of table 3b) are presented in tables 4a and 4b respectively.

The mechanical performances of the prepolymer B with respect to the starting resin in hybrid SMC formulations prepared under comparable conditions are compared in table 5.

TABLE 2a

Formulations comprising neither fillers nor fibers tested (compositions in parts by weight)

| | References of the formulations | | |
|---|---|---|---|
| | ① (comparative) | ② | ③ |
| Starting resin A' | 100 | — | — |
| Prepolymer C | — | 100 | 100 |
| Prepolymer F | — | — | 54.5 |
| MDI (VH20) | 20.36 | 11 | 0 |
| NCO/OH formulation | 0.67 | 0.67 | 0.67* |
| DBTDL | a few drops | a few drops | a few drops |

*NCO resulting from the prepolymer F

TABLE 2b

Comparative progress of the exothermicity and of the viscosity over time for the formulations

| | References of the formulations | | |
|---|---|---|---|
| | ① (comparative) | ② | ③ |
| EXOTHERMICITY | | | |
| Tmax achieved (° C.) | 57 | 37 | 30 |
| Time to achieve this Tmax (min) | 35 | 60 | 90 |
| VISCOSITY (in poises) | | | |
| After 1 hour | 396 | 135 | 31 |
| After 2 hours | 531 | 290 | 46 |
| After 3 hours | 42 000 | 710 | 70 |
| After 5 hours | 120 000 | 1240 | 100 |
| After 7 hours | 30 000 | 1770 | 127 |
| After 24 hours | Physical gel | 2303 | 303 |
| After 96 hours | Physical gel | Physical gel | Physical gel |

① (comparative), ② and ③ (formulations of table 2a)

TABLE 3a

BMC formulations tested (compositions in parts by weight)

| | References of the BMC formulations | | |
|---|---|---|---|
| | ① (comparative) | ② | ③ |
| Prepolymer A | — | 100 | — |
| Prepolymer C | — | — | 100 |
| Norsodyne M0070C | 100 | — | — |
| MDI (VH20) | 0 | 9.2 | 11 |
| PBQ | 0.02 | 0.02 | 0.02 |
| TBPEH LAM₂ | 1.3 | 1.3 | 1.3 |
| Calcium carbonate | 80 | 80 | 80 |
| Zinc stearate | 3 | 3 | 3 |
| Total excluding fibers | 184.32 | 193.5 | 195.3 |
| Level of fibers (%) | 45 | 45 | 45 |
| NCO/OH formulation | 0 | 0.67 | 0.67 |

TABLE 3b

SMC formulations tested (compositions in parts by weight)

| | References of the SMC formulations | | | | | | |
|---|---|---|---|---|---|---|---|
| | ①* (comparative) | ② | ③ | ④ | ⑤ | ⑥ (comparative) | ⑦ |
| Starting resin A' | — | — | — | — | — | 100 | — |
| Prepolymer A | — | 100 | — | — | — | — | — |
| Prepolymer B | — | — | 100 | — | — | — | 100 |
| Prepolymer C | — | — | — | 100 | 100 | — | — |
| Prepolymer F | — | — | — | — | 54.5 | — | — |
| Norsodyne M0070C | 100 | — | — | — | — | — | — |
| MDI (VH20) | 0 | 9.2 | 14.3 | 11 | 0 | 23.4 | 16.4 |
| Byk 515 | 0.35 | 0.35 | 0.35 | 0.35 | 0.35 | 0.35 | 0.35 |
| Luperox MC | 1.5 | 1.5 | 1.5 | 1.5 | 1.5 | 1.5 | 1.5 |
| Pigment paste | 2 | 2 | 2 | 2 | 2 | 2 | 2 |
| Calcium carbonate | 50 | 50 | 50 | 50 | 50 | 50 | 50 |
| Zinc stearate | 3 | 3 | 3 | 3 | 3 | 3 | 3 |
| Total excluding fibers | 156.85 | 166.05 | 171.15 | 167.85 | 211.35 | 180.25 | 173.25 |
| Level of fibers (%) | 55 | 55 | 55 | 55 | 55 | 55 | 55 |
| NCO/OH formulation | 0 | 0.67 | 0.67 | 0.67 | 0.67 | 0.77 | 0.77 |

*Formulation thickened with magnesia MK 35NV (3.5%/M0070C)

TABLE 4a

Comparative results for evaluation of the BMC formulations

| | References of the BMC formulations | | |
|---|---|---|---|
| | ① (comparative) | ② | ③ |
| NCO/OH formulation | 0 | 0.67 | 0.67 |
| BENDING | | | |
| Modulus (MPa) | 9500 | 13 052 | 13 300 |
| Stress (MPa) | 95 | 145 | 180 |
| Deflection (mm) | 2.65 | 2.60 | 3.3 |
| Charpy impact (kJ/m$^2$) | 33 | 34 | 36 |

TABLE 4b

Comparative results for evaluation of the SMC formulations

| Characteristics and mechanical performances | References of the SMC formulations | | | | |
|---|---|---|---|---|---|
| | ① (comparative) | ② | ③ | ④ | ⑤ |
| NCO/OH formulation | 0 | 0.67 | 0.67 | 0.67 | 0.67 |
| BENDING | | | | | |
| Modulus (MPa) | 13 535 | 14 810 | 16 475 | 17 900 | 18 000 |
| Stress (MPa) | 325 | 330 | 330 | 370 | 399 |
| Deflection (mm) | 4.2 | 4.2 | 3.1 | 4.2 | 4.6 |
| Charpy impact (kJ/m$^2$) | 111 | 120 | 119 | 106 | 104 |

TABLE 5

Comparative results for evaluation of the SMC formulations 6 and 7

| Characteristics and mechanical performances | References of the SMC formulations | |
|---|---|---|
| | ⑥ (comparative) | ⑦ |
| NCO/OH | 0.77 | 0.77 |
| BENDING | | |
| Modulus (MPa) | 15 000 | 15 020 |
| Stress (MPa) | 345 | 360 |
| Deflection (mm) | 4.5 | 4.9 |
| Charpy impact (kJ/m$^2$) | 155 | 149 |

What is claimed is:

1. An ethylenically unsaturated prepolymer having at least one end functional group X which is reactive by condensation, the end functional group X selected from the group consisting of hydroxyl and/or amine or free isocyanate reactive end functional groups with the absence of any ethylenic unsaturation end functional groups, said prepolymer having a number-average weight Mn (measured by GPC with polystyrene standards) ranging from 1000 to 5000, and an X number, expressed in mg KOH/g, ranging from 30 to 150,
with said prepolymer being the reaction product of the following components A and B:
A) a first component A comprising an ethylenically unsaturated resin carrying hydroxyl and/or amine reactive end functional groups, selected from
1) unsaturated polyesters having an OH number (measured on undiluted solid resin) of 70 to 170 mg KOH/g and an acid number (measured on resin in the undiluted solid state) of less than 10 mg KOH/g, said unsaturated polyesters being based on an acid component comprising at least maleic acid and/or anhydride with an aromatic acid and/or anhydride in a maleic/aromatic molar ratio ranging from 0.6/0.4 to 0.4/0.6, and
2) vinyl esters,
said ethylenically unsaturated resin of component A) being diluted in at least one ethylenically unsaturated monomer which can copolymerize with the ethylenic unsaturation of said resin, and
B) a second component B comprising a polyisocyanate with a functionality of 2 up to 3, and
with the functionality of component A and/or B being greater than 2, and
production of said prepolymers under conditions such that the proportions of A and B and the mean functionality of the reaction mixture A and B satisfy the Macosko-Miller relationship, in order to avoid any gelling by crosslinking, with, per functionality X chosen, the following conditions:
for X=OH and/or amine, a ratio in equivalents r=NCO/(OH+NH$_2$) ranging from 0.01 to 0.6, and with said component B being added, gradually, to said component A, and
for X=free NCO, with a ratio in equivalents r=NCO/(OH+NH$_2$) ranging from 1.2 to 3, and with said component A being added, gradually, to said component B wherein said vinyl esters are the reaction products of a diepoxy, an epoxy novolac or a cycloaliphatic or aliphatic diepoxy, with an ethylenically unsaturated monoacid.

2. The prepolymer as claimed in claim 1, wherein the equivalent weight per ethylenic unsaturation of the backbone of said prepolymer varies from 150 to 2000 g/mol.

3. The prepolymer as claimed in claim 1, wherein said diluting monomer carries at least one ethylenically unsaturated functional group and wherein said monomer is selected from the group consisting of vinyl monomers, (meth)acrylic monomers, and allylic monomers.

4. The prepolymer as claimed in claim 1, wherein said ethylenically unsaturated resin of component A) has an equivalent weight per unsaturation ranging from 140 to 2000 g/mol.

5. The prepolymer as claimed in claim 1, wherein said polyisocyanate is selected from MDI, IPDI, H$_{12}$MDI, TDI, HDI, HDI isocyanurate triisocyanate, or isocyanates which are uretidione, allophanate and biuret derivatives of the preceding diisocyanates.

6. The prepolymer as claimed in claim 1, wherein the reactive X end functional group is hydroxyl and/or amine and wherein the NCO eq./(OH+NH$_2$) eq. ratio varies from 0.01 to 0.6.

7. The prepolymer as claimed in claim 1, wherein the reactive X end functional group is a free isocyanate and wherein said ratio in equivalents $NCO/(OH+NH_2)$ varies from 1.2 to 3.

8. The prepolymer as claimed in claim 7, wherein it further comprises a stabilizer which is a BHT+PTZ combination in an amount ranging from 20 to 1000 ppm.

9. A process for the preparation of the prepolymer as claimed in one of claims 1 to 8, which comprises the following successive stages depending on the functionality X:

for $X=OH$ and/or $NH_2$:
charging the component A as reactor heel, with control of the water content in order not to exceed 1000 ppm,
addition, gradual, of the component B to said component A, to maintain an $OH+NH_2$ excess corresponding to an $r=NCO/(OH+NH_2)$ ratio in equivalents varying from 0.01 to 0.6, optionally in the presence of a catalyst of the reaction of the OH functional groups with the NCO functional groups,
reaction of the components A and B until virtually complete disappearance of the NCO groups, corresponding to an NCO number (in the dilute state) equivalent to $\leq 6$ mg KOH/g, under conditions of absence of gelling by crosslinking, as defined in claim 1, the functionality of component A and/or B being greater than 2, and
optionally, addition of a stabilizer, for $X=$free NCO:
charging, as reactor heel, said component B comprising polyisocyanate in the presence of at least one ethylenically unsaturated monomer for which the water content has been controlled prior to the addition of the isocyanate not to exceed 10 ppm,
controlling the water content of the component A, so as not to exceed 1000 ppm,
optionally, reducing the water content of the component A by a consumption reaction with a monoisocyanate,
addition, gradual, of the component A to said component B comprising polyisocyanate as reactor heel, with an $r=NCO/(OH+NH_2)$ ratio in equivalents varying from 1.2 to 3,
reaction of the components A and B until virtually complete disappearance of the OH groups (and equivalent groups), which corresponds to a number (in the dilute state) equivalent to $\leq 3$ mg KOH/g, under conditions of absence of gelling by crosslinking, as defined in claim 1, the functionality of component A and/or B being greater than 2, and
optionally, in the reaction stage, presence of a catalyst of the reaction of the OH functional groups with the NCO functional groups, and
optionally, stabilization by addition of a stabilizer.

10. A modified functional prepolymer obtained by further reaction of the prepolymer having a free isocyanate X end functional group as claimed in claim 7 with at least one monoalcohol carrying at least one ethylenic unsaturation, wherein said free isocyanate X end functional groups of the prepolymer are all quantitatively converted to urethane end bonds carrying at least one ethylenic unsaturation.

11. A crosslinkable resin composition, comprising at least one prepolymer as claimed in claim 1, formulated with a coreactant, the resulting composition being crosslinkable by radical reaction, by condensation reaction or both.

12. The composition as claimed in claim 11, which comprises at least one prepolymer having a hydroxyl and/or amine X end functional group as claimed in claim 6.

13. The composition as claimed in claim 11, which comprises at least one prepolymer having a free isocyanate X end functional group as claimed in either of claims 7 and 8.

14. The composition as claimed in claim 12, which additionally comprises at least one polyisocyanate with a functionality ranging from 2 to 3 with an NCO eq./$(OH+NH_2)$ eq. ratio varying from 0.6 to 1.1.

15. The composition as claimed in claim 11, which comprises at least two prepolymers: one as claimed in claim 6 having a hydroxyl and/or amine X end functional group and the other as claimed in either of claims 7 and 8 having a free isocyanate X end functional group.

16. The composition as claimed in claim 11, which comprises at least one prepolymer as claimed in claim 10.

17. The composition as claimed in claim 11, which is selected from the group consisting of a molding composition, composites, lightened composites, including foams, SMCs, BMCs, laminates, prepregs, mastics, adhesives, coatings, barrier coats, gel coats, IMCs, polyester concretes and artificial marbles.

18. The composition as claimed in claim 16, which is a coating composition selected from the group consisting of a gel coat, barrier coat and IMC composition.

19. A process for the preparation of a crosslinkable resin composition as defined in claim 11, which comprises adding and mixing said prepolymer as claimed in claim 1 or 10 with said coreactant in said composition, to form said crosslinkable resin composition.

20. The process as defined in claim 19 for preparing a composition selected from the group consisting of molding compositions, composites, lightened composites, including foams, SMCs, BMCs, laminates, prepregs, mastics, adhesives, coatings, barrier coats, gel coats, IMCs, polyester concretes and artificial marbles.

21. A method of preparation of the modified functional prepolymer as defined in claim 10 comprising reacting a prepolymer as claimed in claim 7 having a free isocyanate X end functional group with at least one monoalcohol carrying at least one ethylenic unsaturation wherein all of said free isocyanate X end functional groups of the prepolymer are quantitatively converted to urethane end bonds carrying at least one ethylenic unsaturation.

22. A finished article obtained by crosslinking the crosslinkable resin composition as claimed in claim 11, said article selected from the group consisting of molding compositions (molded components), composites, lightened composites, foams, laminates, prepregs, mastics, adhesives, coatings, barrier coats, gel coats, IMCs, polyester concretes, artificial marbles, insulating sandwich panels, thermal and mechanical protective means, personal protective equipment, windmill blades, motor vehicle parts, marine paints, mechanical parts and pipes.

23. The ethylenically unsaturated prepolymer as claimed in claim 1, wherein the component A) comprises a mixture of:
said ethylenically unsaturated resin carrying hydroxyl and/or amine reactive end functional groups, and
a second resin selected from the group consisting of ethylenically unsaturated hydroxylated resins from unsaturated polyesters, unsaturated polyesteramides, unsaturated polyurethane esters or vinyl esters, and hydroxylated and/or aminated saturated resins.

24. The ethylenically unsaturated prepolymer as claimed in claim 23, wherein said mixture further comprises a third reactive saturated resin selected from the group consisting of polyether polyols, polyester polyols, polyamines, and polyepoxides, said third resin having a functionality of 2 or 3 and a molecular weight Mn of less than 400 g/mol.

25. The composition as claimed in claim 14, further comprising a polyol, polyamine or polyepoxide compound which is reactive with said polyisocyanate.

26. The method as claimed in claim 19, further comprising crosslinking the resulting crosslinkable composition to form a crosslinked resin composition.

27. A composition as claimed in claim 15, wherein said composition is without the presence of other coreactants, excepted the said two prepolymers.

28. A method of preparation of mastics, which can self-crosslink by reaction of NCO functional groups in the presence of atmospheric moisture and at ambient temperature, said method comprising the use of a prepolymer as claimed in either of claim 7 or 8.

29. A modified functional prepolymer obtained by further reaction of the prepolymer having a free isocyanate X end functional group as claimed in claim 8 with at least one monoalcohol carrying at least one ethylenic unsaturation,
wherein said free isocyanate X end functional groups of the prepolymer are all quantitatively converted to urethane end bonds carrying at least one ethylenic unsaturation.

30. The composition as claimed in claim 11, which comprises at least one prepolymer as claimed in claim 29.

31. The composition as claimed in claim 30, which is a coating composition selected from the group consisting of a gel coat, barrier coat and IMC composition.

32. A process for the preparation of a crosslinkable resin composition as defined in claim 11, which comprises adding and mixing said prepolymer as claimed in claim 1 or 29 with said coreactant in said composition, to form said crosslinkable resin composition.

33. The process as defined in claim 32 for preparing a composition selected from the group consisting of molding compositions, composites, lightened composites, including foams, SMCs, BMCs, laminates, prepregs, mastics, adhesives, coatings, barrier coats, gel coats, IMCs, polyester concretes and artificial marbles.

34. A method of preparation of the modified functional prepolymer as defined in claim 29 comprising reacting a prepolymer as claimed in claim 8 having a free isocyanate X end functional group with at least one monoalcohol carrying at least one ethylenic unsaturation wherein all of said free isocyanate X end functional groups of the prepolymer are quantitatively converted to urethane end bonds carrying at least one ethylenic unsaturation.

35. The process as claimed in claim 32, further comprising crosslinking the resulting crosslinkable composition to form a crosslinked resin composition.

* * * * *